May 9, 1967 J. H. AXE 3,319,169

RADIO RECEIVING SYSTEM INCLUDING SQUELCH MEANS

Filed Nov. 27, 1963 2 Sheets-Sheet 1

INVENTOR.
JOEL H. AXE
BY Allen M. Sutton
ATTORNEY

RADIO RECEIVING SYSTEM INCLUDING SQUELCH MEANS

Filed Nov. 27, 1963 2 Sheets-Sheet 2

INVENTOR.
JOEL H. AXE
BY Allen M. Sutton
ATTORNEY 3,319,169

RADIO RECEIVING SYSTEM INCLUDING SQUELCH MEANS

Joel H. Axe, Los Angeles, Calif., assignor, by mesne assignments, to The Bunker-Ramo Corporation, Stamford, Conn., a corporation of Delaware Filed Nov. 27, 1963, Ser. No. 326,562
3 Claims. (Cl. 325—392)

This invention relates generally to systems for receiving radio signals and more particularly to an improved system embodying a novel arrangement for automatically quieting the receiving system in the absence of preselected signals, thus making the system relatively insensitive to noise signals.

There are many instances involving remote control operations where radio receiving systems are utilized to receive and cause a response to various commands, which are represented by the presence or absence of signals having various predetermined frequencies. For example, in the area of space technology, missiles and satellites may receive such signals from a control station to cause them to alter their courses or to transmit various kinds of data back to the control station. A difficulty frequently encountered with such ssytems heretofore known is that electrical noise signals may be received and mistaken by the system for command signals during periods of time when no command signals or other information signals are received, because quite often the noise signals alone may suffice to energize the squelch or quieting circuits which in turn activate the receiving system. Therefore, unless means are provided to quiet the receiving system and prevent the noise signals from causing the receiving system to be activated and produce output signals, such spurious signals may be mistaken for desired information signals.

The need to quiet a receiver during periods of time in which an information signal is not being received is similarly present in conventional radio receivers whether they are of amplitude-modulated (AM) or frequency-modulated (FM) types. Although several types of quieting or squelch circuits are known today and have been extensively used heretofore, their overall performance is limited and the circuits used are susceptible to malfunction under abnormal conditions. For example, most presently available squelch circuits operate on the principle that the signal strength will increase over that of the noise alone upon receipt of a signal. In the absence of a signal, the squelch circuit is adjusted to a threshold level which is just above the average noise level. At such a level the receiver is deactivated and has no output signal. However, as soon as a signal is received, the sum of the noise signals and the additional signal exceeds the threshold level thereby activating the receiver to produce an output signal. Under abnormal conditions, however, the noise signals may suddenly increase above the threshold level so that receiver may be activated even though no true information signal is being received. Similarly, interferring signals may raise the received signal level above the threshold level thereby mistakenly activating the receiver. Similar disadvantages are present in squelch circuits used in connection with FM receivers, which are generally based upon the principle that a reduction in audio output will occur in the presence of a signal, the reduced audio output being utilized to activate the receiver to then produce an output signal.

Thus, it is extremely desirable to provide a receiving system which is quiet during periods of time in which a signal is not being received and which is insensitive to noise signals or interferring signals.

Broadly speaking the invention is based on frequency discrimination techniques employed in developing a signal in response only to a selected tone signal which is simultaneously received by a receiver with the rest of the meaningful information signals. The signal so developed is in turn used to activate the receiver in order to pass the information signals to an output stage. In the absence of the selected tone signal, the receiver remains deactivated, having no output signal irrespective of the level of any noise signals received by it.

According to the teachings of the present invention, a tone signal having a preselected frequency is transmitted to the receiver together with the desired information signals. The frequency of the tone may differ depending on the particular application of the information signals. For example, in an audio communication system, the frequency of the tone signal is preferably beyond the audio frequency range so as not to be perceived by the human ear, while in other applications where audible or superaudible function tones are use to control certain functions, the frequency of the tone signal may be selected to be outside the frequency range of the function tones used for the various control functions. In still other applications where tones are used to control certain functions, the frequency of the tone signal may be selected to be within the frequency range of a particular function tone, so that whenever the receiving ssytem is activated by the tone signal the particular function tone is also present so as to perform its control function.

The receiver, which may be adapted to receive and demodulate FM signals, AM signals or pulse modulated (PM) signals, is of a conventional type generally comprising a radio frequency (R.F.) section for receiving, amplifying and detecting the desired modulating signals, as is well known in the art. In addition to the conventional receiver the receiving circuit of the invention further includes a discriminator and a keyer, which follow the normal detection stage in the conventional receiver.

The characteristics of the discriminator are such that, when a signal is received that has a frequency corresponding to that to which the discriminator is tuned, the output from the discriminator is zero. However, as the frequency of the received signal deviates from that to which the discriminator is tuned, the discriminator provides positive and negative direct voltage output signals, whose amplitudes are indicative of the amount of frequency deviation of the received signal and whose polarities depend upon the direction of the frequency deviation. The discriminator produces positive and negative peak voltage output signals in response to received signals having predetermined frequency deviations from the frequency to which the discriminator is tuned. In one embodiment of the present invention, the discriminator is so tuned that one of its peak voltage output points corresponds in frequency to the frequency of the received tone. The receipt of the tone signal results in a peak voltage output signal from the discriminator. The signal is further filtered and utilized to operate a keyer, which may be a D.C. amplifier or a Schmitt trigger circuit, which in turn produces an output signal in response to the signal from the discriminator. The output signal from the keyer is then used to control the normally developed output signal from an output amplifier, such as the final audio amplifier, in the otherwise conventional receiver. In the absence of the tone signal, the discriminator does not produce an output signal, since any noise signals receiver thereby are quantitatively equal on both sides of the discriminator frequency range resulting in substantially no D.C. output, which is in turn reflected in the absence of an output signal from the keyer, resulting in the receiver output being deactivated. However, upon receipt of a tone signal, the output signal from the discriminator produces an output signal from the keyer, which activates the output amplifier of the receiver so that a normal output signal is produced.

The invention as described hereinafter in greater detail further includes an arrangement whereby the tone signal of preselected frequency is produced in the receiver rather than received by it together with the rest of the desired signals. This arrangement is based on signal mixing techniques, whereby the carrier signal received by the receiver is mixed with a signal produced by a beat oscillator in the receiver, resulting in an output signal which serves as the tone signal having the frequency necessary to produce the desired output signal from the discriminator. The technique of mixing or beating two signals of different frequencies to produce an output signal having a frequency which is the difference or sum of the two different frequencies is well known in the art.

Further advantages and novel features of the invention will become apparent from the following description taken in conjunction with the accompanying drawings, in which.

Figure 3:
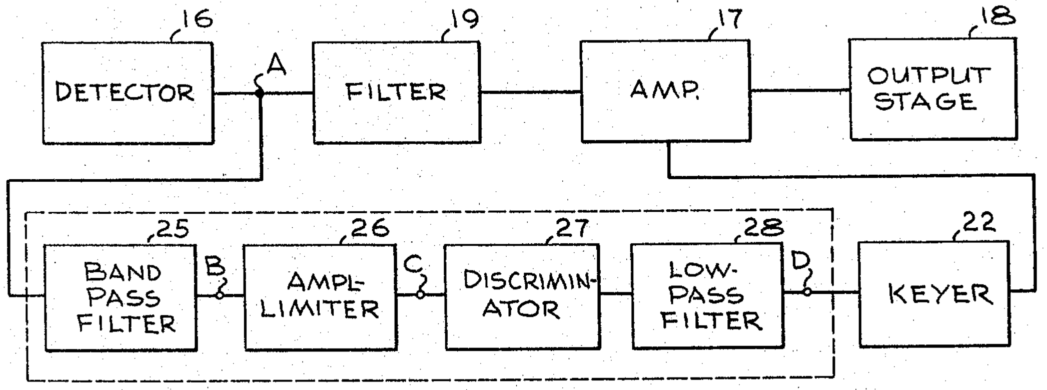
FIG. 3 is a more detailed block diagram of the embodiment of the present invention shown in FIG. 2.
Figure 4A:
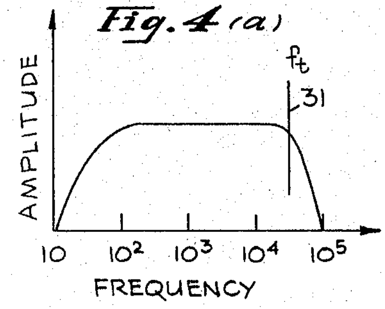
Figure 4B:
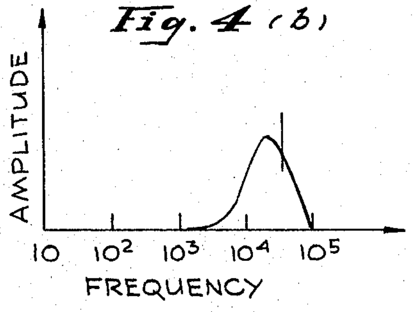
Figure 4C:
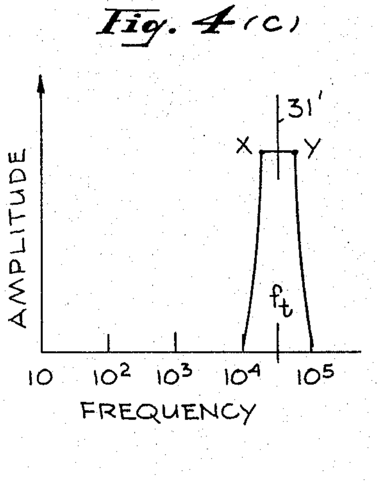
Figure 4D:
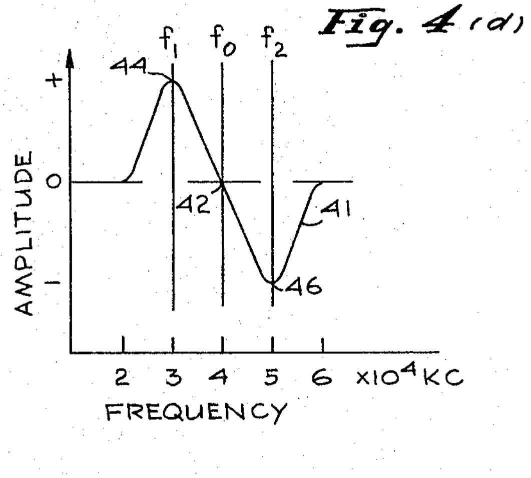
Figure 5:
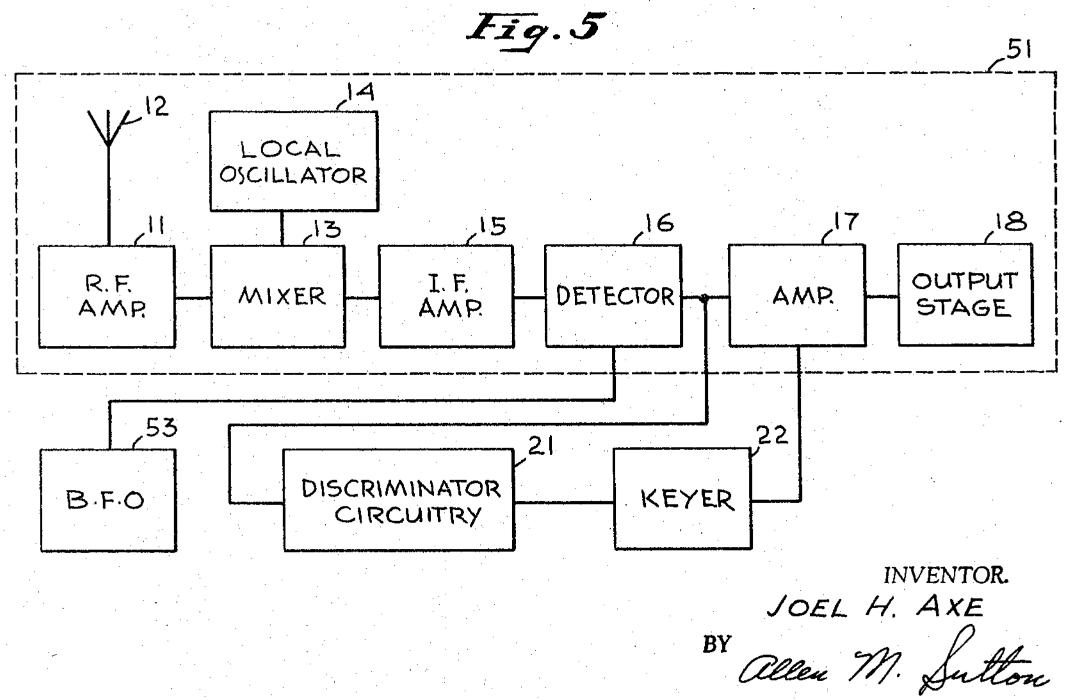

FIGS. 4(*a*), 4(*b*) and 4(*d*) represent frequency versus amplitude diagrams useful in understanding the circuitry shown in FIG. 3; and FIG. 5 is a block diagram of another embodiment of the invention.

Figure 1:
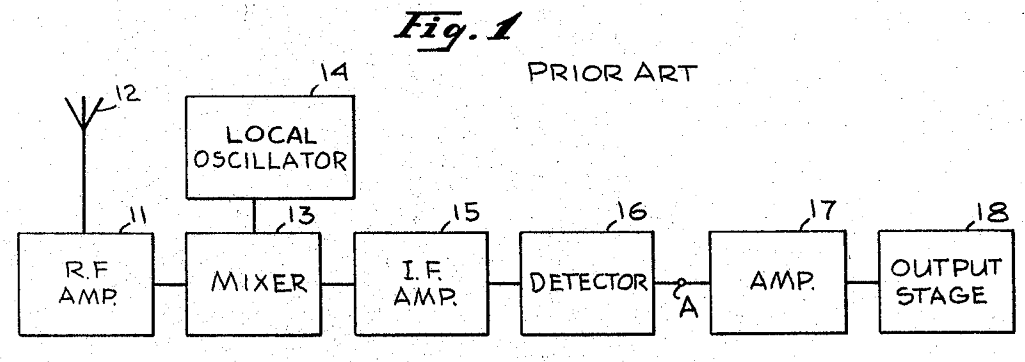
FIG. 1 is a block diagram of a known receiving system for radio signals.

The block diagram of FIG. 1 illustrates a typical receiver that is well known in the art. The receiver comprises a radio frequency (R.F.) amplifier 11 for amplifying incoming radio signals received by an antenna 12. The amplified radio signals are then passed to a mixer 13, which is also supplied with signals from a local oscillator 14, the output of the mixer comprising signals whose frequency is a function of the respective frequencies of the signals from the R.F. amplifier 11 and the local oscillator 14. The signals from the mixer 13 are then first supplied to an intermediate frequency (I.F.) amplifier 15 for amplification therein and then to a detector 16, wherein the modulating information signals present in the initially received radio signals are detected. The detector 16 may be either an amplitude modulation or a frequency modulation detector, as appropriate for the received signals. The information signals are supplied to an amplifier 17 which is connected to the output of the detector 16 at a terminal designated by the letter A. The amplifier 17 has a frequency bandwidth characteristic which is wide enough to pass and amplify all the information signals. Thus, if the information signals fall in the audio frequency range, the amplifier 17 may be a conventional audio amplifier. The output signals from the amplifier 17 are then supplied to an output stage 18, which in an audio system generally comprises a power amplifier and one or more speakers. As is well known in the art, a receiver similar to the one illustrated in FIG. 1 when turned on produces a noise output signal, even though no information-bearing radio signals to which the R.F. amplifier 11 is tuned are received by the antenna 12. This is due to noise signals detected by the receiver which pass through the amplifier 17 to the output stage 18.

Figure 2:
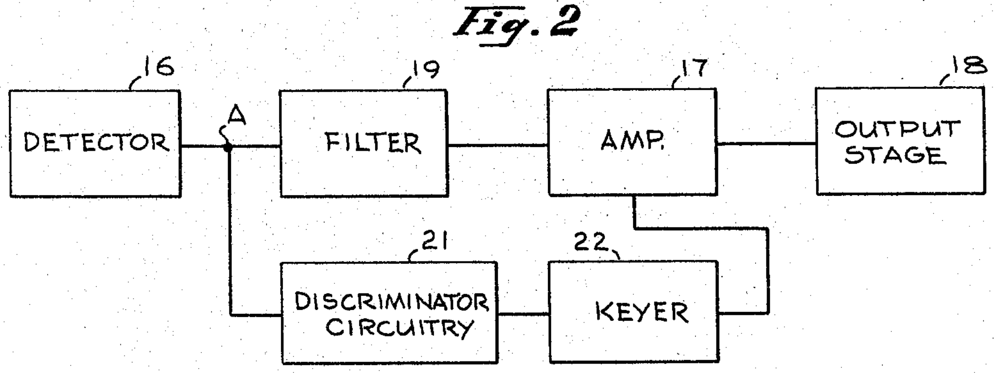
FIG. 2 is a block diagram of one embodiment of the present invention.

However, according to the invention disclosed herein, a conventional receiver may be quieted in the absence of the reception of desired information signals by incorporating discriminator circuitry 21 whose output is provided to a keyer 22, as shown in FIG. 2. The input terminal of the discriminator circuitry 21 is connected to the terminal A between the detector 16 and the amplifier 17, and the output of the keyer 22 is connected to the amplifier 17 to control its operation as will be described hereafter in detail.

According to one embodiment of the present invention, a constant-frequency tone signal is transmitted to the receiver together with the rest of the information signals, such signals being detected by the detcetor 16 and simultaneously supplied to the amplifier 17 and the discriminator circuitry 21.

The discriminator circuitry 21 is operable to detect the tone signal and to produce an output signal, which in turn energizes the keyer 22 whose output activates the amplifier 17, so that the information signals supplied thereto are amplified and fed to the output stage 18. Preferably, the amplifier 17 is preceded by a filter 19 having a frequency bandwidth which excludes the tone signal, so that it is blocked from being supplied to the output stage.

The amplifier 17 effectively acts as gating means which passes signals only when it is opened by a signal from the keyer 22. In the absence of a signal from the keyer, the gating means pass no signals. Thus, it is apparent that what is referred to as the "amplifier 17," actually may not be an amplifier but rather may be a gating cricuit which merely passes signals without amplification. The discriminator circuitry may comprise various circuits capable of producing an output signal in response to a tone signal of a particular frequency. Therefore, the following description is presented for explanatory purposes only, it being understood that the invention is not limited thereto.

Reference is now made to FIG. 3 where one example of the discriminator circuitry 21 is shown in block form as comprising a band-pass filter 25 connected to an amplifier-limiter 26 at terminal point B, the output of the amplifier-limiter 26 being connected to a frequency discriminator 27 at a terminal point C. The frequency discriminator 27 is connected to the keyer 22 at a terminal point D through a low-pass filter 28.

The operable relationship of the circuits comprising the discriminator circuitry 21 of FIG. 3 may best be explained in connection with a specific example. Let us assume that signals falling within a frequency spectrum and having frequency versus amplitude characteristics as shown in FIG. 4(*a*) have been detected by a detector 16 and supplied to the filter 25 (FIG. 3). From FIG. 4(*a*), it is clear that the signals supplied to the filter are mostly in the audio frequency range from 10 cycles to about 20,000 cycles per second (c.p.s.), but also include a tone signal having a frequency $f_t$ as indicated by a line 31. The frequency $f_t$ is beyond the conventional audio frequency range and is approximately equal to 50,000 c.p.s. The filter 25 is tuned to greatly attenuate most frequencies below 10,000 c.p.s., producing an output signal at the terminal B which has frequency versus amplitude characteristics as shown in FIG. 4(*b*), which when amplified and limited by the amplifier-limiter 26 may be represented by FIG. 4(*c*). As seen therein, the output signal of the amplifier is of constant amplitude for a band of frequencies between about 20,000 and 60,000 c.p.s., as indicated by line XY in FIG. 4(*c*). The band of frequencies also includes the tone signal frequency $f_t$ as indicated by a line 31', while frequencies below and beyond this band are attenuated sharply. The signals from the amplifier-limiter 26 having frequency versus amplitude characteristics as shown in FIG. 4(*c*) are then supplied to the frequency discriminator 27 which produces an output signal as shown by line 41 in FIG. 4(*d*) whose amplitude is a function of the frequency of the input signal to the discriminator.

As previously explained and as shown in FIG. 4(*d*), an input signal having a certain frequency $f_0$ to which the discriminator is tuned produces zero output from the discriminator, as indicated by the point of intersection 42. However, for frequencies below and above the frequency $f_0$ the discriminator produces positive and negative direct voltage output signals, respectively, whose amplitudes depend on their frequency deviation from the tuned frequency $f_0$. For example, input signals of frequencies $f_1$ and $f_2$ to the discriminator 27 will produce peak voltage output signals of positive and negative polarities, as indicated by numerals 44 and 46, respectively. In the present example, the frequency of the tone signal $f_t$ is chosen to be equal to either $f_1$ or $f_2$ depending on whether a positive or negative signal is needed to trigger the keyer 22. Thus, when the tone signal is supplied to the discriminator, a peak voltage output signal is produced to trigger the keyer which may be a D.C. amplifier or a Schmitt trigger adjusted to energize and activate the amplifier 17 (FIG. 3) only when a peak voltage signal from the discriminator 27 is supplied thereto.

From the foregoing description it is apparent that in the absence of a tone signal detected by the receiving system the frequency discriminator 27 will not produce a peak voltage output signal. In the absence of such signal, the keyer 22 will not be triggered so that the amplifier 17 remains deactivated, which, in turn, prevents any signals from reaching the output stage 18. It should be further noted that since the discriminator 27 is placed in the system at a point where the audio signals throughout the pass band of the discriminator are of a relative constant amplitude, any D.C. components of noise signals alone will tend to balance out on the positive and negative sides of the discriminator, and will result in a zero direct voltage output signal. Receipt of a tone signal, however, whose frequency corresponds to the voltage output signal peak (either positive or negative) of the discriminator, will result in a signal sufficient to energize the keyer 22 and activate the amplifier 17.

Briefly summarizing, the receiving system thus far described incorporates a novel arrangement which is responsive to a tone signal received by the system along with information signals. When received, the tone signal, being of a preselected frequency, energizes the frequency discriminator circuitry to produce an output signal, which, in turn, causes the keyer to activate the audio amplifier (gating means) to pass signals to the output stage of the receiving system.

In another embodiment of the present invention, the radio signals received by the antenna 12 may carry one of two constant frequency tone signals, the frequency of the two signals being chosen to be substantially equal to the frequencies $f_1$ and $f_2$ of the discriminator 27 whose amplitude versus frequency characteristic is as shown in FIG. 4($d$). One of the tone signals may then serve to produce a signal sufficient to trigger the keyer 22 (FIG. 2) while the other tone signal will cause the discriminator to produce a signal which will insure that the keyer is not triggered. For example, let us assume that the keyer is triggered only upon being energized by a positive signal having an amplitude as indicated by numeral 44 in FIG. 4($d$). Then by transmitting a tone signal whose frequency is substantially equal to $f_2$, the discriminator produces a negative output signal thereby insuring that the amplifier 17 of the receiving system is deactivated. Only when a tone signal of a frequency equal to $f_1$ is received will the discriminator 21 produce a positive signal sufficient to trigger the keyer 22.

Such an arrangement is particularly important in "command destruct" applications where additional safety factors must be introduced to insure that the receiver is activated only when a particular tone signal is present. Therefore, by introducing a second tone signal which is tuned to the opposite peak of the discriminator any false signals are prevented from activating the receiving system.

In another embodiment of the present invention, the tone signal is generated in the receiving system itself, rather than being transmitted to the receiving system as in the previous embodiment. As shown in FIG. 5, the receiving system comprises a conventional receiver generally designated by numeral 51, the internal circuitry therein being identical to the circuitry illustrated in FIG. 1.

In addition, however, the system includes a beat frequency oscillator (B.F.O.) 53 which is connected to the detector 16, with the output of the detector being connected to the discriminator circuitry previously described as well as to the amplifier 17. The beat frequency between the I.F. and the beat frequency oscillator is selected to be above the cut-off frequency of the amplifier 17 and substantially equal to $f_1$ or $f_2$ (see FIG. 4($d$)) so that when the detector 16 is energized by signals from both the I.F. amplifier 15 and the beat frequency oscillator 53, its output includes signals of the selected beat frequency. Such signals when supplied to the discriminator circuitry 21 will produce a peak voltage output signal sufficient to trigger the keyer 22 so that gating means such as the amplifier 17 may be activated. It is clear, therefore, that even though a tone signal is not transmitted to and received by the receiving system, such a tone signal may be generated in the receiving system once radio signals of a known carrier frequency are received by the system. In the absence of the carrier frequency, the mixer 52 will not produce a signal of a frequency capable of producing a peak voltage output signal of the discriminator so that the amplifier 17 remains deactivated with no output from the output stage 18.

From the foregoing it can now be seen that the invention provides a novel circuitry arrangement for quieting or squelching a receiving system in the absence of radio signals, the circuitry being relatively insensitive to noise signals. According to the teachings of the invention, the output amplifier and output stages of the receiving system are deactivated or quieted in the absence of a tone signal. However, once the tone signal is transmitted to the receiver or generated therein, a trigger signal is produced which activates the amplifier or other gating means which, in turn, passes information signals to the output stage of the system.

Although the system was described in light of a frequency discriminator and a keyer, it is apparent that other circuits may be used to activate and deactivate gating means by means of a tone signal as a function of its frequency or amplitude. Similarly, the output signal of the frequency discriminator was described in terms of peak voltages; however, it is clear that peak current output signals may be used to trigger the keyer which controls the quieting of the receiver output. It is apparent that many other changes and modifications may be made in the invention by one skilled in the art without departing from the true spirit and scope of the invention.

The embodiments of the invention in which an exclusive property or privilege is claimed are defined as follows.

What is claimed is:

1. A radio receiving system comprising:
detector means for receiving signal energy within a predetermined radio frequency band;
gating means;
filter means coupling said detector means to said gating means, said filter means having a band pass characteristic excluding a portion of said radio frequency band;
discriminator means responsive to signals of first and second frequencies within said radio frequency band for respectively providing output signals of predetermined amplitude and opposite polarity;
means coupling said detector means to said discriminator means; and
means responsive to a signal of said predetermined amplitude and one polarity provided by said discriminator means for enabling said gating means and responsive to a signal of said predetermined amplitude and another polarity provided by said discriminator means for disabling said gating means.

2. A radio receiving system comprising:
means for receiving remotely transmitted signals within a predetermined radio frequency band;

means for locally producing signals of a predetermined frequency;

means for mixing said received signals and said locally produced signals to produce a beat frequency signal;

discriminator means responsive to a signal of a first frequency for producing a first output signal of a predetermined amplitude;

means applying said beat frequency signal to said discriminator means;

gating means;

means applying said received signals to said gating means; and means responsive to said first output signal for enabling said gating means.

3. A radio receiving system comprising:

means for receiving remotely transmitted signals within a predetermined radio frequency band;

means for locally producing signals of a predetermined frequency;

means for mixing said received signals and said locally produced signals to produce a beat frequency signal;

discriminator means respectively responsive to signals of first and second frequencies for producing first and second output signals of predetermined amplitude and opposite polarities;

means applying said beat frequency signal to said discriminator means;

gating means;

means applying said received signals to said gating means; and means responsive to said first output signal for enabling said gating means and said second output signal for disabling said gating means.

References Cited by the Examiner

UNITED STATES PATENTS

| | | | |
|---|---|---|---|
| 2,480,115 | 8/1949 | Brown | 325—348 |
| 2,602,852 | 7/1952 | Lense | 340—171 |
| 2,602,885 | 7/1952 | Armstrong | 325—348 |
| 2,980,794 | 4/1961 | Hargreaves | 325—392 X |
| 3,187,234 | 6/1965 | Muranka | 340—171 X |

KATHLEEN H. CLAFFY, *Primary Examiner.*

R. P. TAYLOR, *Assistant Examiner.*